Feb. 10, 1970   C. G. DUNLAP   3,494,319
TOWING ARRANGEMENT FOR WATER SKIING AND LIKE SPORTS
Filed July 1, 1968   2 Sheets-Sheet 1

INVENTOR.
CARROLL G. DUNLAP
BY
Kurt Hanchen

United States Patent Office 3,494,319
Patented Feb. 10, 1970

3,494,319
TOWING ARRANGEMENT FOR WATER SKIING AND LIKE SPORTS
Carroll G. Dunlap, 189 Alma St.,
Rohnert Park, Calif. 94928
Filed July 1, 1968, Ser. No. 741,421
Int. Cl. A63c *11/10*
U.S. Cl. 115—6.1                6 Claims

ABSTRACT OF THE DISCLOSURE

A towing arrangement for water skiing and like sports comprising a clasp having a concave lower segment for the reception of the handle bar of a tow line, hinged to the end of said segment remote from the skier's body, i.e., on the side of the towing vehicle a one-armed holding lever adapted to fit over a handle bar received in the concavity of said lower segment, an eye formed on the end of said lower segment near the skier's body, and a rope threaded loosely through said eye. The ends of said rope are attached to the sides of a floatation belt, and for this purpose the belt may be provided with laterally located, outwardly projecting loops.

---

The present invention relates to sports wherein a person allows himself to be towed by an automotive vehicle, such as a car or a motor boat, or by a horse, and for this purpose holds on to the reins of the horse or a handle on a line connected to the towing vehicle, such as is the case in the sports of skijoring or water skiing. Sports of this type require considerable force exerted by the skier's fingers to hold on to the handle or rein; and they place great and often painful strains upon the skier's fingers and the delicate bone structure in the mid-portion of his hands when the vehicle increases its speed or changes its course suddenly, or the skier encounters increased resistance, such as may be caused by unevenness in the condition of the ground or cross currents in the water. While the strain on the skier's hands may be relieved by attaching the towing line or the reins to parts of the skier's body, this presents a grave danger because if the skier loses his balance and comes to a fall, he may be dragged over the ground nor pulled through the water, and may be seriously mauled or even drowned.

An object of the invention is to furnish a towing arrangement for sports, of the type referred to, which provides a positive connection between the towing line and a part of the skier's body other than his fingers, and which will yet relinquish the skier automatically and instantaneously when an emergency arises.

Yet another object of the invention is to provide a towing arrangement, of the type referred to, whose manipulation requires a minimum effort on the skier's part.

Still another object of the invention is to provide a towing arrangement of the type referred to, that operates to protect the skier from the twisting forces exerted upon his body by sudden changes in the course of the towing vehicle and/or changes in his position relatively to the towing vehicle, such as may be caused by waves and cross currents in the water, or by uneven snow conditions.

An additional object of the invention to provide an arrangement of the type referred to, that may be used in connection with conventional tow lines without necessitating any changes in, or installation of special appliances or attachments on, conventional tow lines.

A further object of the invention is to provide an arrangement of the type referred to, that is of simple and inexpensive construction.

These and other objects of the present invention will be apparent from the following description of the accompanying drawings which illustrate certain preferred embodiments thereof and wherein FIGURE 1 is a perspective of the towing arrangement of my invention including a clasp for engagement over the handle bar of a towing line and a floatation belt for the skier's body, to which the clasp is attached by means of a rope;

In accordance with the invention I provide a clasp which slides loosely on a cord or rope that is attached to the skier's body. Said clasp has a concave bottom segment within which may be received the handle bar with which towing lines are now-a-days usually provided. Hingedly secured to said bottom segment is a one-armed holding lever by means of which the handle bar is releasably held within the clasp. The clasp is of such construction that it is safely held in engagement over the handle bar of the towing line by moderate manual pressure upon a holding lever yet will immediately and automatically release the handle bar when the skier withdraws his hand from said holding lever as he will do instinctively in case of an emergency. The fact that the clasp slides loosely on the rope or cord that connects it to the skier's body provides the added advantage that a straight line of thrust is at all times preserved between the towing vehicle and the skier's body even though the vehicle may suddenly change its course and/or the skier's body may suddenly be deflected from its initial course by waves, cross currents, or uneven snow conditions. Formerly, such sudden changes in the course of the towing vehicle or the position of the skier's body exerted a twisting force upon the skier's body, causing him to tumble and come to a fall.

Figure 1:
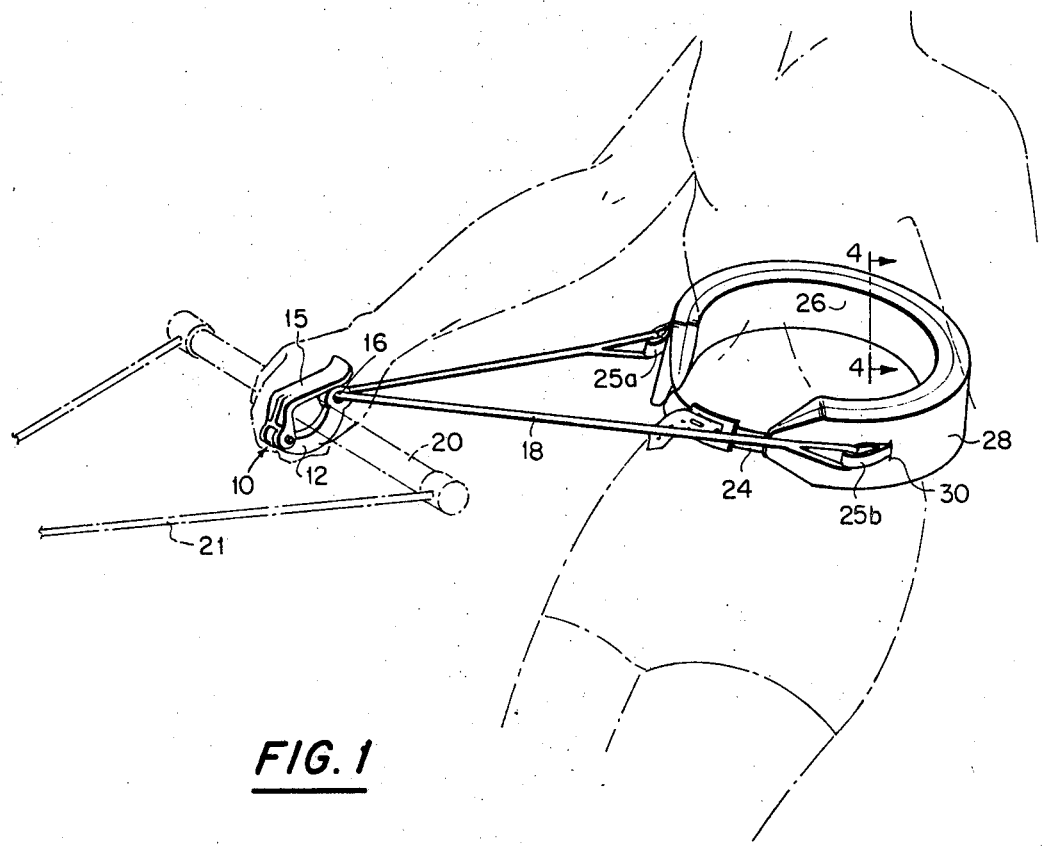
Figure 2:
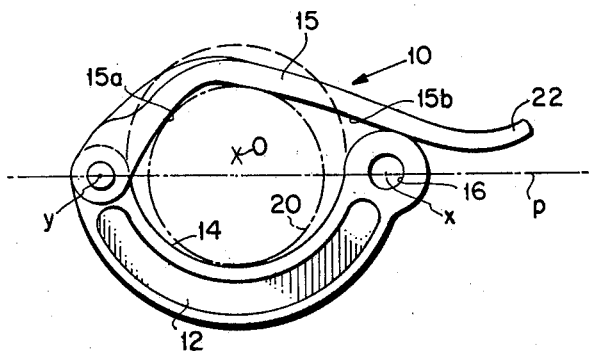
FIGURE 2 is a side elevation of the clasp shown in FIGURE 1.

The towing arrangement of my invention comprises a clasp 10 (FIGURES 1 and 2) composed of a lower segment 12 which forms on its upper side a smooth-surfaced concave arc 14 of less than semi-circular angular width, and a one-armed holding lever 15. One end of said lever is hingedly connected to the leading end of the segment 12, i.e., the end remote from the skier's body on the side of the towing vehicle. On its opposite end, i.e., the end near the skier's body, the segment 12 forms an eye or loop 16 through which is loosely threaded a rope 18 by means of which the clasp 10 is connected to the skier's body in a manner to be described in greater detail hereinafter. The inner surface of the one-armed lever is also smoothly rounded and forms a concavity adapted to fit over a handle bar 20 placed into the concavity of the lower segment 12, and the lever is of such length as to extend beyond the eye 16 on the lower segment 12 when closed over the handle bar. Its projecting end is formed into an upwardly curved lip 22 to minimize the danger that the hand holding the lever in closed condition may slip accidentally from said lever. The construction of the lower segment 12 is such that the plane defined by the center axis X of the eye 16 and the axis Y of the hinge connection between said segment and the one-armed lever 15 is located below the center point O of the circle determined by the concavity of said lower segment (FIGURE 2). To increase the retentive effect of the holding lever when said lever is closed over a handle bar located in the concavity of the lower segment, and thus reduce the effort on the skier's part in holding the clasp in closed condition over the handle bar, said lever has an initial relatively short run 15a that rises from the hinge connection Y relatively steeply to a point above and on the hinge side of the center point O of the circle defined by the concavity of the lower segment 12, and from said point on extends in a substantially straight or only slightly curved concave line 15b to and beyond the eye 16 at the end of the lower segment 12. Due to the described formation of the upper surface of segment 12 and of the lower surface of holding lever 15, the pull of the towing line 21 upon the handle bar 20 will cause said bar to leap readily out of the concavity of the lower segment, whenever the skier releases the holding lever, come fully against the inner surface of the initial run 15a of said holding lever 15, kick said lever in this manner backwardly about its hinge Y and thus release the handle bar of the towing line dependably from operative connection with the skier's body. On the other hand, due to the length of the long part 15b of the holding lever 15, it will require only very moderate pressure by the skier's hand upon its free end to hold it dependably in closed condition over the handle bar of the towing line as long as a towing connection between the towing vehicle and the skier is desired.

Figure 3:
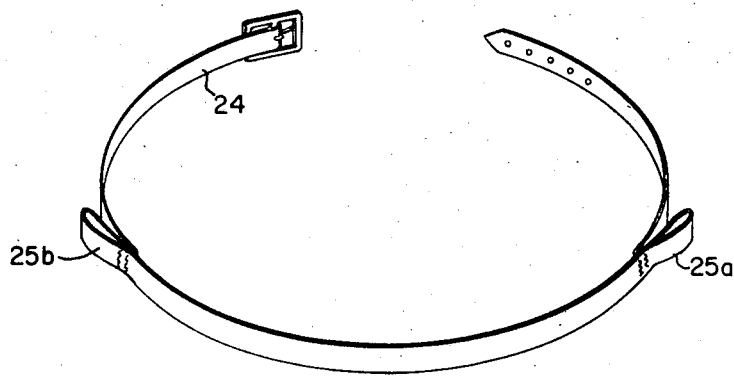
FIGURE 3 is a perspective of a component of the floatation belt shown in FIGURE 1.
Figure 4:
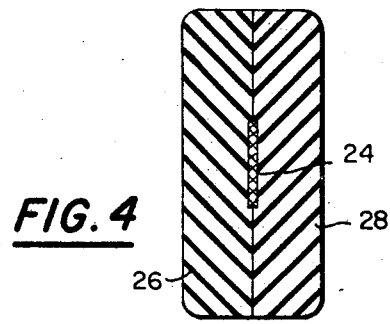
FIGURE 4 is a cross section through the center portion of the floatation belt shown in FIGURE 1.

In most water sport areas water skiers are now-a-days required to wear floatation belts, i.e., belts (FIGURE 1) to which pads or layers of floatation material are laminated. In the preferred embodiment of the invention illustrated in FIGURE 1, the belt webbing 24 is provided with outwardly directed loops 25a and 25b in the areas that will cover the flanks of the wearer (FIGURE 3), and is interposed between an inner pad or layer of floatation material 26 and an outer pad or layer 28 of the same material, which latter is provided with slots 30 (FIGURE 1) in the flank areas. When the pads 26 and 28 are laminated to each other with the belt webbing 24 interposed between them, the loops 25 protrude through said slots 30, as shown in FIGURE 1. To said loops are suitably tied the free opposite ends of the cord or rope 18 that passes loosely through the eye 16 at the near end of the lower clasp segment 12, as previously explained. The towing arrangement of my invention is now ready for use.

Figure 5:
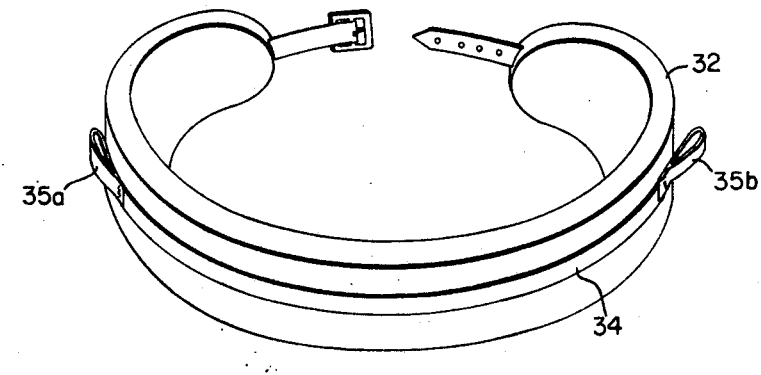
FIGURE 5 is a modified embodiment of a floatation belt, such as may form part of the towing arrangement of the invention.

Any conventional floatation belt, such as shown at 32 in FIGURE 5, may readily be adapted to form part of the towing arrangement of my invention. It is merely necessary to secure a strip 34 of canvas, plastic material, leather, and the like, provided with looped ends 35a and 35b in any suitable manner, such as by stitching or cementing to the middle portion of the floatation belt 32.

By means of the towing arrangement of my invention it is possible for a water skier to establish and maintain a towing connection between the towing vessel and his body with a minimum effort. All that is necessary is to place the handle bar of the towing line into the concavity of the lower segment of the clasp 10 and close the one-armed lever 15 over the handle bar. It is now an easy matter for the skier to hold the lever 15 in closed position by moderate pressure upon its free end, as indicated in phantom lines in FIGURE 1, and the device of my invention will work satisfactorily with most of the presently available types of towing handles whether they are made wood, metal or plastic material and whether the handle is hard-surfaced or covered with a sheath of resilient material. Due to the fact that the aperture in the eye 16 of the lower clasp segment 12 is larger than the thickness of rope 18, the clasp 10 may slide freely on rope 18 from one to the other side of the skier when the course of the towing vessel changes and/or when the position and course of advance of the skier's body changes due to waves, cross-current or unevenness of the ground in case of snow skiing. Thus, the thrust line between the towing vessel and the skier's body will always remain straight and no dangerous twisting moments are applied to the skier's body, such as might bring him to a fall and which often cause serious injuries; and if an emergency arises, release of the clasp 10 by the skier's hand will cause the handle bar 20 of the towing line 21 to leap from the concavity of the lower clasp segment, come against the initial portion 15a of lever 15 and kick said lever open, resulting in dependable and instantaneous release of the handle bar of the towing line. Thus there is no danger that the skier may be dragged through the water or over icy snow fields.

While I have described my invention with the aid of certain preferred embodiments thereof, it will be understood that the invention is not limited to the specific constructional details shown and described by way of example, which may be departed from without departing from the scope and spirit of my invention. Thus, the clasp of my invention may be tied by means of the rope 18 to an ordinary belt without floatation material, or to a floatation harness, such as shown in my U.S. Patent No. 3,324,818 issued June 13, 1967 for a Towing Arrangement for Water Skiing and the Like, or to an ordinary chest harness without floatation material.

I claim:
1. A towing arrangement for water skiing and like sports comprising a clasp having a concave segment for the reception of the handle bar of a tow line, hinged to the end of said segment remote from the skier's body a holding lever having a concave surface adapted to fit over a handle bar received in the concavity of said segment, said holding lever being of such length as to extend over the opposite end of said segment near the skier's body, an eye formed in said opposite end, a rope loosely threaded through said eye and means for attachment of the opposite ends of said rope to opposite sides of the skier's body.

2. An arrangement according to claim 1 wherein said clasp is of such construction that the plane determined by the axis of said eye and the axis of the hinge connection between said segment and said holding lever is located below the center point of the circle determined by the concavity of said segment.

3. An arrangement according to claim 2 wherein said lever arm terminates in an upwardly curved lip.

4. Arrangement according to claim 1, wherein said attachment means is a flotation belt having outwardly directed loops provided at its flank portions, and the opposite ends of said rope are secured to said loops.

5. Arrangement according to claim 4 wherein said flotation belt has an inner layer of flotation material and bonded thereto an outer layer of flotation material, said outer layer having slots in its flank sectors and wherein said loops are formed at the ends of a strap interposed between said layers of flotation material, with said loops protruding outwardly through said slots.

6. Arrangement according to claim 4 wherein said loops are formed at the opposite ends of a strap and said strap is secured to an intermediate area of the outer surface of said flotation belt.

References Cited

UNITED STATES PATENTS

| 2,458,786 | 1/1949 | Lagergren. | |
| 3,071,100 | 1/1963 | Nicholson et al. | 115—6.1 |
| 3,142,263 | 7/1964 | Craft | 104—202 |

TRYGVE M. BLIX, Primary Examiner